United States Patent [19]
Kirby et al.

[11] 3,710,259
[45] Jan. 9, 1973

[54] ELECTRICAL AMPLIFYING APPARATUS FOR ELECTRICAL SIGNALS OF PROGRESSIVELY DECAYING AVERAGE AMPLITUDE

[75] Inventors: Robert A. Kirby, Houston, Tex. 77024; Billy J. Propst, Houston, Tex. 77036

[73] Assignee: ESSO Production Research Company, Houston, Tex.

[22] Filed: Nov. 27, 1970

[21] Appl. No.: 92,962

[52] U.S. Cl..................................325/187, 325/62
[51] Int. Cl...........................H04b 1/04, H04b 1/00
[58] Field of Search........325/62, 159, 187, 400, 416, 325/61; 340/177, 188; 332/203, 205, 12, 42

[56] References Cited

UNITED STATES PATENTS

| | | | |
|---|---|---|---|
| 2,750,451 | 6/1956 | Crow | 325/187 |
| 3,258,711 | 6/1966 | Searl et al. | 325/187 |
| 3,231,686 | 1/1966 | Hueber | 325/62 |
| 2,550,312 | 4/1951 | Terroni et al. | 325/62 |

*Primary Examiner*—Robert L. Griffin
*Assistant Examiner*—Barry Leibowitz
*Attorney*—James A. Reilly, John B. Davidson, Lewis H. Eatherton, James E. Gilchrist, Robert L. Graham and James E. Reed

[57] ABSTRACT

A buoy for use in seismic surveying at marine locations comprises an elongated housing with a flotation member positioned near the normal waterline of the device. The lower portion of the housing or battery section is of greater diameter than the upper section, and a tethering ring for connection to an anchor is located at the upper end of the battery section so that the cross sectional area below the tethering ring is substantially equal to the cross sectional area of the housing above the tethering ring. A seismic detection apparatus, conveniently a hydrophone, is used to detect seismic signals and preferably rests on the water bottom. A seismic amplifier within the housing amplifies the geophone signals. The gain of the amplifier is controlled by a circuit that varies the gain in accordance with a weighted function of the amplitude of the output signals of the amplifier over an interval of at least two minutes. The output signal of the amplifier also is used to amplitude modulate a signal generator of constant frequency or constant repetition rate, and the amplitude modulated signal is used to frequency modulate a radio transmitter.

2 Claims, 4 Drawing Figures

PATENTED JAN 9 1973
3,710,259
SHEET 1 OF 2
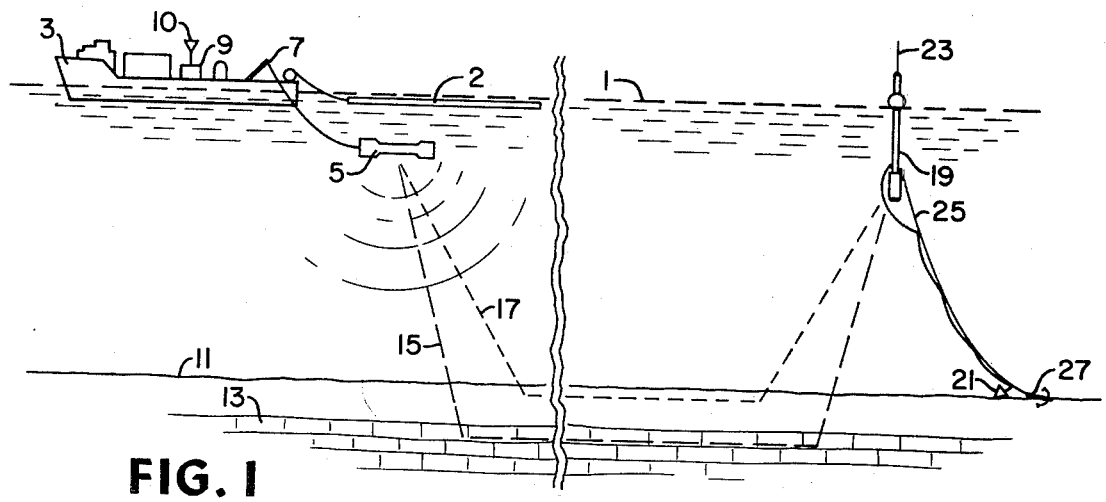
FIG. 1
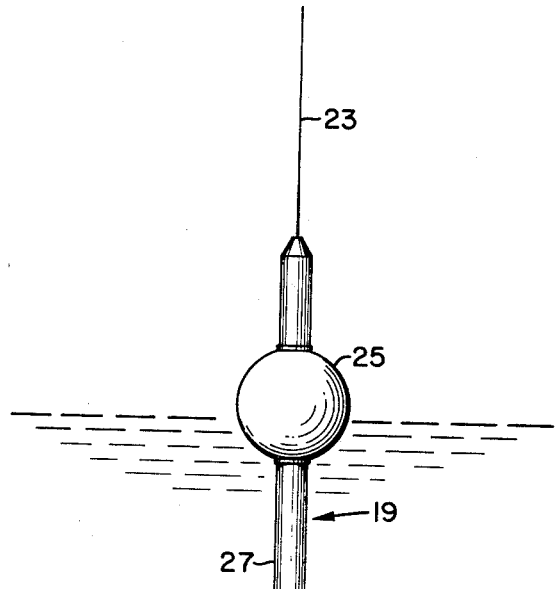
FIG. 2
INVENTORS
ROBERT A. KIRBY
BILLY J. PROPST
BY 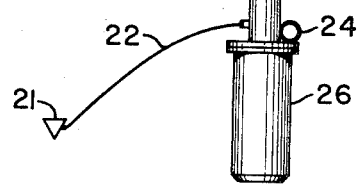
ATTORNEY

INVENTORS
ROBERT A. KIRBY
BILLY J. PROPST

BY *John B Davidson*

ATTORNEY

3,710,259

ELECTRICAL AMPLIFYING APPARATUS FOR ELECTRICAL SIGNALS OF PROGRESSIVELY DECAYING AVERAGE AMPLITUDE

BACKGROUND OF THE INVENTION

This invention relates to seismic surveying using the refraction technique, and more particularly, to refraction seismic surveying at marine locations wherein seismic wave detecting apparatus is moored at a predetermined location and seismic waves are produced on a vessel movable with respect to the location of the detecting apparatus.

In seismic surveying at marine locations, it is customary to use the reflection seismic technique wherein seismic energy is produced in the water near a vessel and detected by a number of seismic wave detectors located in a marine cable extending from the vessel to distances up to 10,000 feet from the vessel. The refraction seismic technique has not been widely practiced at marine locations for a number of reasons. In practicing the refraction technique, it is desirable to station a seismic pickup at a location that is fixed relative to the vessel at which seismic energy is produced. The detected seismic signals either must be recorded at the detecting site or must be transmitted by a radio link to a recorder stationed on the vessel. Recording the seismic signals at the site at which the signals are detected necessarily means that some sort of fixed platform must be provided or that an anchored vessel must be used on which the recording equipment and power supply therefor can be mounted. Under normal circumstances, this approach is economically undesirable. When the recording equipment is stationed aboard the vessel carrying the seismic energy source, the very wide variation in amplitude of the detected signals makes it difficult to transmit the seismic signal to the vessel over a radio link. Seismograms obtained by marine refraction surveys using prior art equipment and techniques have not been satisfactory.

SUMMARY OF THE INVENTION

In accordance with one aspect of the present invention, there is provided a method for obtaining refracted seismic data records at marine locations which comprises locating a seismic wave detector at a given marine location, producing from a vessel a sequence of seismic disturbances at time space intervals at a plurality of locations along a traverse extending from the detecting location, and detecting seismic energy at said detecting location to produce an electrical data signal indicative of the detected seismic energy. The electrical data signal is amplified and the amplified signal is transmitted to the vessel by a radio communications link, and recorded. There is also produced at the detecting location an electrical control signal having an amplitude that, at any given instance, is a weighted average of the energy content of the amplified signal over a period of at least 2 minutes prior to said instant. The amplification of the electrical data signal is varied in accordance with the amplitude of said electrical control signal. Preferably, the seismic energy is produced at time intervals of between 10 and 50 seconds at locations spaced apart between 100 and 300 feet. In the preferred mode of the invention, portions of the data signal having greater than a predetermined amplitude are truncated to said predetermined amplitude before amplification thereof.

In accordance with another aspect of the invention there is provided apparatus for amplifying electrical signals produced by a seismic wave detector which comprises a variable gain electrical amplifying means including a control circuit for controlling the gain thereof. There is also provided rectifier means connected to the output of said amplifying means and an integrating type circuit including an integrating capacitor shunted by a resistance element. The capacitor and resistance element have a time constant of at least 2 minutes. The integrating circuit is connected between the rectifier and amplifying means to produce a control voltage for controlling the amplification of said amplifying means.

According to still another aspect of the invention there is provided apparatus for transmitting a data signal to a remote location, which apparatus comprises a variable gain electrical amplifying means for amplifying the signal and gain varying circuit means for controlling the amplification of said variable gain electrical amplifying means at any given time as a weighted function of the amplitude of the signals previously amplified thereby. There is also provided low frequency generator means and first modulator means for modulating a characteristic of the output signal of said low frequency low generator means in accordance with the output signal of said variable gain electrical amplifying means. Radio frequency transmitter means is provided along with means from modulating a characteristic of the output signal of the radio frequency transmitter means in accordance with the modulated output signals from the low frequency signal generator means.

Objects and features of the invention not apparent from the above discussion will become evident upon consideration of the following detailed description thereof taken in connection with the accompanying drawings which should be taken in an illustrative sense and not by way of limitation.

BRIEF DESCRIPTION OF THE DRAWINGS

In the drawings:

FIG. 1 is a schematic diagram of apparatus for conducting a refraction seismic survey at a marine location in accordance with the invention.

FIG. 2 is a side view of the seismic refraction buoy illustrated in FIG. 1 showing certain of the mechanical details thereof.

DESCRIPTION OF THE PREFERRED EMBODIMENT

Figure 3:
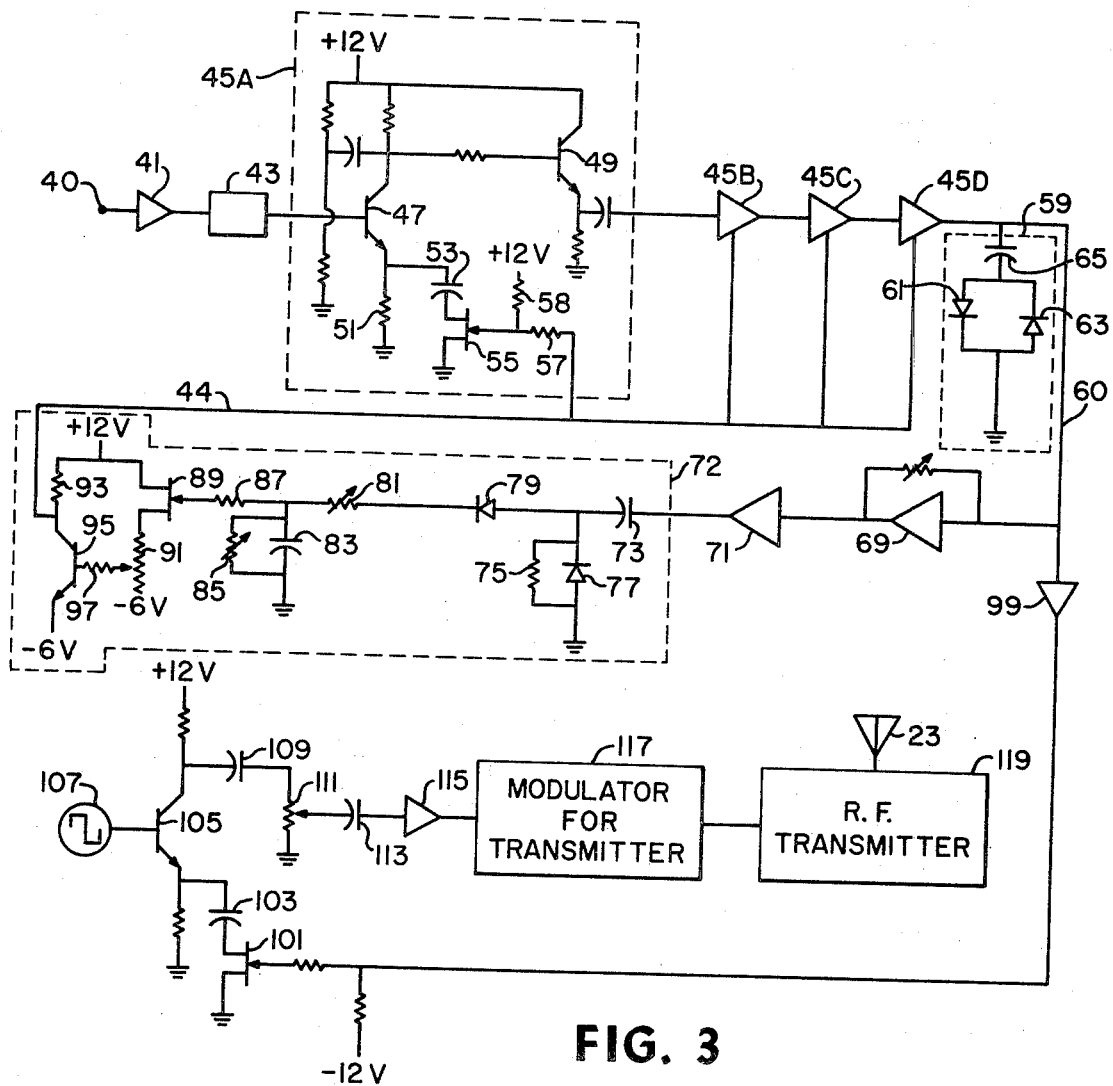
FIG. 3 is an electrical diagram, partially in block form, illustrating apparatus carried by the seismic refraction buoy of FIGS. 1 and 2.

With reference now to FIG. 1 there is illustrated apparatus for conducting seismic surveys at marine locations using the refraction technique. Shown in FIG. 1 is a vessel 3 in a body of water 1 and seismic refraction buoy 19 moored at a location away from the vessel 3 by means of a tether line 25 and anchor 27. The line 25 connects the seismic refraction buoy 19 to the anchor 27 so that the seismic refraction buoy is stationed at a predetermined location in the body of water 1. Trailing from the vessel 3 is a seismic energy source 5 which may be a device as described in U. S. Pat. No.

3,480,101 for producing repetitive bursts of seismic energy as the vessel 3 passes through the water. A seismic wave detector unit, which may be a hydrophone, is connected to the seismic refraction buoy 19 by means of a line 22 including electrical leads for connecting the output signal of the seismic wave detector unit 21 to electrical circuitry housed within elongated housing member 27 (see FIG. 2). The lower end 26 of the seismic refraction buoy is designed to house electrical batteries for energizing the circuits within the housing member 27. A generally spherical shaped flotation member 25, which may be of a buoyant plastic such as styrofoam having a closed cellular structure is affixed to the cylindrical member 27. The housing member 27 passes through the buoyant member 25 and terminates at a radio antenna 23. A tether ring 24 is provided so that line 25 may be connected thereto. The position of the tether ring is such that the sum of the vertical cross sectional areas, as viewed, of housing member 26 and of the portion of the housing member 27 below the ring is equal to the cross sectional area of housing member 27 above the ring. By connecting the tether ring in this manner, any currents in the body of water will exert equal and opposite forces above and below the tether ring so that the structure will remain upright and will not incline or tip in any direction.

Aboard the vessel 3 there is housed the usual control circuits for energizing the seismic energy source 5 and for recording seismic signals picked up by seismic detectors in accordance with the usual technique of seismic exploration. If it is desired to simultaneously conduct a reflection survey, a seismic cable 2 is trailed over the end of the vessel 23. The seismic cable 2 contains a multiplicity of seismic wave detectors designed to preferentially detect seismic waves which are reflected from subsurface earth formations. Reference numeral 9 designates apparatus for detecting radio signals emitted from antenna 23 and for demodulating signals and recording the demodulated signals. Such apparatus will be described below in greater detail. A radio receiving antenna 10 is shown connected to the apparatus 9.

With reference now to FIG. 3 there is shown a schematic electrical diagram, partially in block form, of apparatus which is housed in the elongated cylindrical member 27. An electrical terminal 40 is provided for connection to the line leading to the hydrophone 21. The electrical signal appearing at terminal means 40 is applied to an amplifier 41 and a pass band filter 43 for attenuating signals having less than a first given frequency and higher than a second given frequency. The output signals from filter 43 are applied to cascaded amplifiers 45A, 45B, 45C, and 45D, the gains of which are controlled in accordance with the amplitude of an electrical signal appearing on line 44. The output signal from amplifier 45D is applied to an amplitude limiting circuit or clipper 59, the function of which is to limit the amplitude of the output signals from amplifier 45D, of either positive or negative polarity, to a predetermined value. This amplitude limiting circuit is conventional and may comprise a pair of parallel connected, oppositely poled zener diodes 61, 63, and a coupling capacitor 69 for coupling the zener diodes 61 and 63 to the output circuit of amplifier 45D. The amplitude clipped output signal from the limiting circuit 59 is applied to cascade connected isolating amplifiers 69 and 71. The output signal of amplifier 71 is coupled by means of capacitor 73 to a gain control circuit 72 the function of which is to produce a signal on a line 44 having an amplitude indicative of a weighted function of the energy content of the electrical signal applied to amplifier 69 over a time period of at least 1,200 times the average period of the data signal appearing at terminal 40. Expressed in another manner, the function of the circuit 42 is to produce a gain control signal on line 44 for amplifiers 45A, 45B, 45C, and 45D that at any given instant is a weighted average of the energy content of the output signal of amplifier 45D appearing at the input of amplifier 69 over a period of at least 2 minutes prior to said given instant. Thus at any given time the signal appearing on line 44 is indicative of the energy in the data signal appearing at line 40 over a time interval of at least 2 minutes preceding said given time.

The control circuit 72 comprises a half wave rectifier 77 shunted by a resistor 75 for rectifying negative half cycles of the output signal of amplifier 71, a coupling diode 79, and an integrator comprising a variable resistor 81 connected in series with integrating capacitor 83 which is shunted by a variable resistor 85. The time constant of the circuit can be adjusted preferably by adjusting the value of resistor 85. The signal appearing across capacitor 83 is applied to a source follower type amplifier including field effect transistor 89, which in turn is coupled to an amplifier including transistor 95. The source follower amplifier has a very high input impedance to present a negligible load to capacitor 83. The rectifier output signal from coupling diode 79 is indicative of the energy content of the signal applied to terminal 40, and this is integrated by the integrating capacitor. However, the effect of the energy of any cycle of the signal on the output signal from the integrating amplifier appearing on line 44 progressively diminishes in time because the signal appearing across capacitor 83 is continuously being discharged through resistor 85. Thus an extremely high-amplitude sequence of cycles of reasonably short time duration (e.g., 40 or 50 milliseconds) will not have a large effect on the control signal on line 44. Preferably, the value of resistor 85 is adjusted so that the effect of any given cycle of the signal appearing at terminal 40 on the amplitude of the signal on line 44 effectively disappears after about 2 minutes. The advantage of this arrangement will become apparent below.

The output signal from amplifier 45D is also applied to an isolating amplifier 99. A subcarrier signal generator 107 (preferably a square wave generator) is coupled through a transistor amplifier including transistor 105 and through a buffer amplifier 115 to an FM modulator 117. The output signal of transistor amplifier 105 is connected to the amplifier 115 through capacitor 109, potentiometer 111, and capacitor 113. Effectively, the amplifier 105 comprises a modulator for the output signal from signal generator 107 inasmuch as the signal from amplifier 99 is coupled to the base circuit of the amplifier through a field effect transistor 101 and capacitor 103. The repetition rates of frequency of the output signal generator 107 is chosen to be several times the maximum frequency appearing at the output of amplifier 99 so that the amplitude of the signal appearing across potentiometer 111 is varied in accordance with the amplitude of the output signal of amplifier 99. Thus the signal appearing across potentiometer 111 has the frequency or repetition rate of the output signal of signal generator 107 and an amplitude determined by the amplitude of the output signal amplitude 99. This signal is applied to the FM modulator 117 to control the output frequency of radio frequency transmitter 119 in the usual manner. Thus the output of the radio frequency transmitter 119 is in effect double-modulated since it is modulated by a signal having the frequency of signal generator 107 and an amplitude determined by the output signal from amplifier 99. The radio frequency signals produced by transmitter 119 are radiated by antenna 23.

The amplifier 45A comprises a pair of cascade connected transistor amplifiers including transistors 47 and 49. Amplifier 47 has a resistor 51 connected in the emitter circuit thereof which is shunted by a capacitor 53 in series connection with a symmetrical field effect transistor 55. The conductivity of the field effect transistor is varied in accordance with the voltage on line 44. Thus the gain of the amplifier including transistor 47 is controlled by increasing or decreasing the shunting or bypass effect of bypass capacitor 53 by varying the conductivity of the field effect transistor 55.

Figure 4:
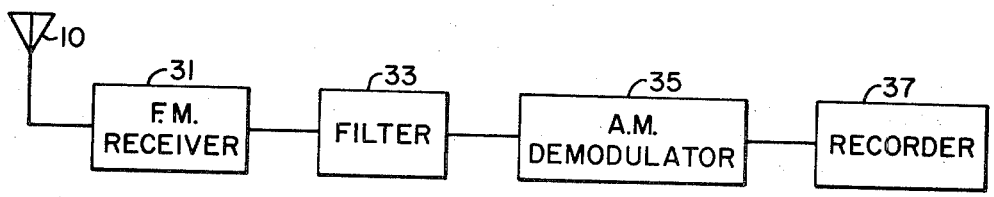
FIG. 4 is a block electrical diagram of apparatus carried by the vessel illustrated in FIG. 1.

In FIG. 4 is illustrated apparatus carried aboard the vessel 3 for receiving the signal radiated by antenna 23, for filtering the signal, demodulating it, and recording the modulated signal. The radio frequency signal picked up by antenna 10 is applied to a frequency modulation receiver which is adapted to FM demodulate the signal so as to produce an output signal essentially the same as the signal applied to modulator 117. This signal is applied to a peaked filter 33, the function of which is to accept and pass only the subcarrier frequency generated by generator 107 and reject all other spurious reception. The output signal of filter 33 is applied to a conventional AM demodulator 35, the output signal of which is substantially the same as the signal produced by amplifier 99. This signal may be recorded by a seismic recorder adapted to record signals having a duration of at least 10 seconds, although it is preferred that it have the ability to record signals having a duration of 20 or 30 seconds to make maximum use of the capabilities of the invention.

The operation of the invention will now be described with reference to the four figures generally. Let it be assumed that the seismic refraction buoy 19 has been stationed at a particular detecting location and that the vessel 3 is traveling along a traverse that passes through the location of the seismic refraction buoy 19. Normally, the seismic refraction buoy is actuated at about every 10 seconds as is customary in reflection seismography. When the distance between the vessel 3 and the seismic refraction buoy 19 becomes greater than about 10 miles, it will be necessary to increase the time between successive actuations of the source 5, preferably to 15 or 20 seconds.

Each burst of seismic energy from the source 5 will produce seismic waves that are subsequently detected by the detector 21. These seismic waves will travel from the source 5 to the detector by a multiplicity of ray paths. Assume that the vessel has moved far enough away from the seismic refraction buoy 19 so that some of the waves are refracted by the interface between the water and the upper most layer of earth, as designated by reference numeral 11, and by the interface between the first earth layer and the second earth layer as designated by the reference numeral 13. Initially, the direct arrivals transmitted through the water will arrive before the arrival of refractive seismic waves, but within a short time the direct arrivals will arrive at a later time than refracted seismic waves. The direct arrivals will have a very high amplitude, much greater than the amplitude that will cause limiting action by the amplitude limiter 59 so that the output signal on line 60 produced by water-borne arrivals will be truncated. This is highly desirable inasmuch as the water-borne arrivals do not have geologic significance and if they were permitted to control the gain of amplifiers 45A, 45B, 45C, and 45D, would serve to mask refractive seismic waves by substantially reducing the gain of the amplifiers as will become apparent below. The signals produced by the source 5 after having been refracted and detected by detector 21 are amplified by the cascade connected amplifiers 45A, 45B, 45C, and 45D and are applied to the gain control circuit 72. Initially, the gain control circuit will be set at some convenient gain determined by experience. After a short time interval the output signal appearing on line 44 will begin to increase as the voltage across capacitor 83 increases as a result of high amplitude signals being applied to the rectifier 77 (the vessel being quite close to the seismic refraction buoy) and through diode 79 and resistor 81 to the capacitor 83. After about 1 ½ to 2 minutes the control signal on line 44 will reach a maximum value such that the gain of the amplifiers will be at a predetermined minimum value. Thereafter, as the amplitude of the signals detected by seismic wave detector 21 diminish in value because of the increasing distance between the detector 21 and the source 5 the signal appearing on line 44 will also progressively diminish in value and the gain of the amplifiers 45A . . . 45D will progressively increase. Because of the long time constant of capacitor 83 and resistor 85, the gain of the amplifiers 45A . . . 45D will increase in value only very slowly and will not be affected by short-term high amplitude seismic waves that may be detected by the seismic wave detector 21. Thus the effect of short-term transients and the water-borne seismic waves from the source 5 is minimized so that refracted seismic waves are detected and amplified at levels within the amplification capabilities of the amplifiers 45A . . . 45D (i.e. the amplifiers are not saturated). The output signals from the amplitude limiter 59 are applied to amplifier 99 and serve to amplitude modulate the constant frequency signal from signal generator 107. The amplitude modulated signal is applied to isolating amplifier 115 and to the FM modulator 17 for radio frequency transmitter 19. The signals from the radio frequency transmitter are transmitted to the vessel 3 whereat they are doubly detected (i.e. subjected to both frequency modulation detection and amplitude modulation detection) by the FM receiver 31 and the AM demodulator 35 and applied to the seismic recorder 37 to produce a seismogram on which events resulting from refractive seismic waves are predominately displayed and may be interpreted in accordance with the usual techniques for refraction seismograms. Numerous field experiments have been performed to determine the effectiveness of the present invention whereas refraction seismograms produced by prior art techniques have been difficult to interpret and have contained a minimum of significant geophysical information, seismograms produced in accordance with the present invention have been found to be very easy to interpret and have contained events indicative of geophysical structures as deep as 10,000 to 15,000 feet below the water surface. Significant refraction events have appeared on traces produced when the source and the detector were as much as 18 miles apart. Using prior art techniques, significant geophysical information could not be obtained when the source and the detector were further apart than 6 miles.

What is claimed is:

1. Apparatus for transmitting a data signal to a remote location, said apparatus comprising:

variable gain amplifying means having an input circuit and an output circuit for amplifying said data signal;

rectifier means connected to the output of said electrical amplifying means for rectifying the output signal of said electrical amplifying means;

integrating circuit means having a time constant of at least 2 minutes connected to the output circuit of said rectifier circuit means for producing an output voltage that is a weighted average of the amplitude of the output signal of the variable gain amplifier means with the weight given to the amplitude at any instant progressively diminishing as a function of time;

circuit means connected to said integrating circuit means and to said variable gain electrical amplifying means for controlling the gain of said variable gain electrical amplifying means as an inverse function of said output voltage;

low frequency signal generator means;

first modulator means for modulating a characteristic of the output signal of said low frequency signal generator means in accordance with the output signal of said variable gain amplifying means;

radio frequency transmitter means; and second modulator means connected to said transmitter means and to said first modulator means for modulating a characteristic of the output signal of said radio frequency transmitter means in accordance with the modulated output signal from said low frequency generator means.

2. The apparatus of claim 1 further including clipping circuit means connected to the output of said variable gain amplifying means for limiting the output signal of said variable amplifying means.

* * * * *